United States Patent
Ngoroi

(10) Patent No.: US 11,353,554 B2
(45) Date of Patent: *Jun. 7, 2022

(54) SYSTEMS AND METHODS FOR IMPERVIOUS SURFACE DETECTION AND CLASSIFICATION

(71) Applicant: WOOLPERT, INC., Dayton, OH (US)

(72) Inventor: Daniel K. Ngoroi, Centerville, OH (US)

(73) Assignee: Woolpert, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,737

(22) Filed: Jan. 25, 2021

(65) Prior Publication Data
US 2021/0141057 A1 May 13, 2021

Related U.S. Application Data

(63) Continuation of application No. 15/906,196, filed on Feb. 27, 2018, now Pat. No. 10,901,091.

(51) Int. Cl.
| | |
|---|---|
| *G01S 7/48* | (2006.01) |
| *G01S 17/89* | (2020.01) |
| *G01S 17/42* | (2006.01) |
| *G06V 20/13* | (2022.01) |
| *G06V 20/10* | (2022.01) |

(52) U.S. Cl.
CPC ............ *G01S 7/4802* (2013.01); *G01S 17/42* (2013.01); *G01S 17/89* (2013.01); *G06V 20/13* (2022.01); *G06V 20/176* (2022.01); *G06V 20/188* (2022.01)

(58) Field of Classification Search
CPC ........ G01S 17/89; G01S 7/4802; G01S 17/42; G06K 9/0063; G06K 9/00637; G06K 9/00657

See application file for complete search history.

(56) References Cited

U.S. PATENT DOCUMENTS

| 7,660,430 B2 * | 2/2010 | Navulur | G06K 9/0063 |
| | | | 382/100 |
| 2021/0303922 A1 * | 9/2021 | Tu | G01S 17/931 |

OTHER PUBLICATIONS

Saksena et al., Geographical Area Mapping and Classification Utilizing Multispectral Satellite Imagery Processing Based on Machine Learning Algorithms, Proceedings of the 2nd International conference on Electronics, Communication and Aerospace Technology (ICECA 2018) IEEE Conference Record # 424 (Year: 2018).*

Bauer et al., Impervious Surface Mapping using Satellite Remote Sensing, 2002, IEEE, 0-7803-7536-X, pp. 2334-2336 (Year: 2002).*

* cited by examiner

*Primary Examiner* — Mischita L Henson
(74) *Attorney, Agent, or Firm* — Ulmer & Berne LLP

(57) ABSTRACT

Systems and methods are provided for impervious surface mapping of a target geographic area. The impervious surface mapping utilizes four-band imagery data and light detection and ranging (LIDAR) data collected from the target geographic area. The identified impervious surfaces can be attributed to parcels within the target geographic area for purposes of generating bills for storm water runoff to parcel owners.

20 Claims, 8 Drawing Sheets

SYSTEMS AND METHODS FOR IMPERVIOUS SURFACE DETECTION AND CLASSIFICATION

CROSS-REFERENCE TO RELATED APPLICATIONS

This application is a continuation of U.S. Ser. No. 15/906,196, entitled SYSTEMS AND METHODS FOR IMPERVIOUS SURFACE DETECTION AND CLASSIFICATION, filed on Feb. 27, 2018, the disclosure of which is incorporated herein by reference in its entirety.

BACKGROUND

Impervious surfaces prevent water from absorbing into the ground and greatly impact natural processes on land and in bodies of water. Impervious surface is any material, natural or manmade, that prevents the infiltration of surface water to the underlying strata. Impervious surfaces can be buildings, roads, sidewalks, parking lots or other paved surfaces. Such surfaces increase runoff volume, transport contaminants, and are the leading contributor to non-point source pollution in urban watersheds.

As a city grows, so does its amount of impervious surface area. To help curb these negative effects to stormwater systems, the Environmental Protection Agency's National Pollutant Discharge Elimination System (NPDES) program requires environmentally conscious stormwater management practices. Many municipalities and local government agencies are forming, or have formed, stormwater utilities to address an increasing fiscal burden of meeting many of the water quality regulatory requirements. Stormwater utilities can generate bills for property owners within the municipality based on the impervious surface area owned by the property owner. The determination of pervious/impervious surface area contained within each parcel of the municipality, however, can be a significant task for such stormwater utilities. Furthermore, with continuing development, both in existing developed areas and new developments, maintaining a complete and up-to-date parcel map, along with the determination of pervious/impervious surfaces, is a continuing challenge for many communities.

BRIEF DESCRIPTION OF THE DRAWINGS

The present disclosure will be more readily understood from a detailed description of some example embodiments taken in conjunction with the following figures.

DETAILED DESCRIPTION

Figure 1:
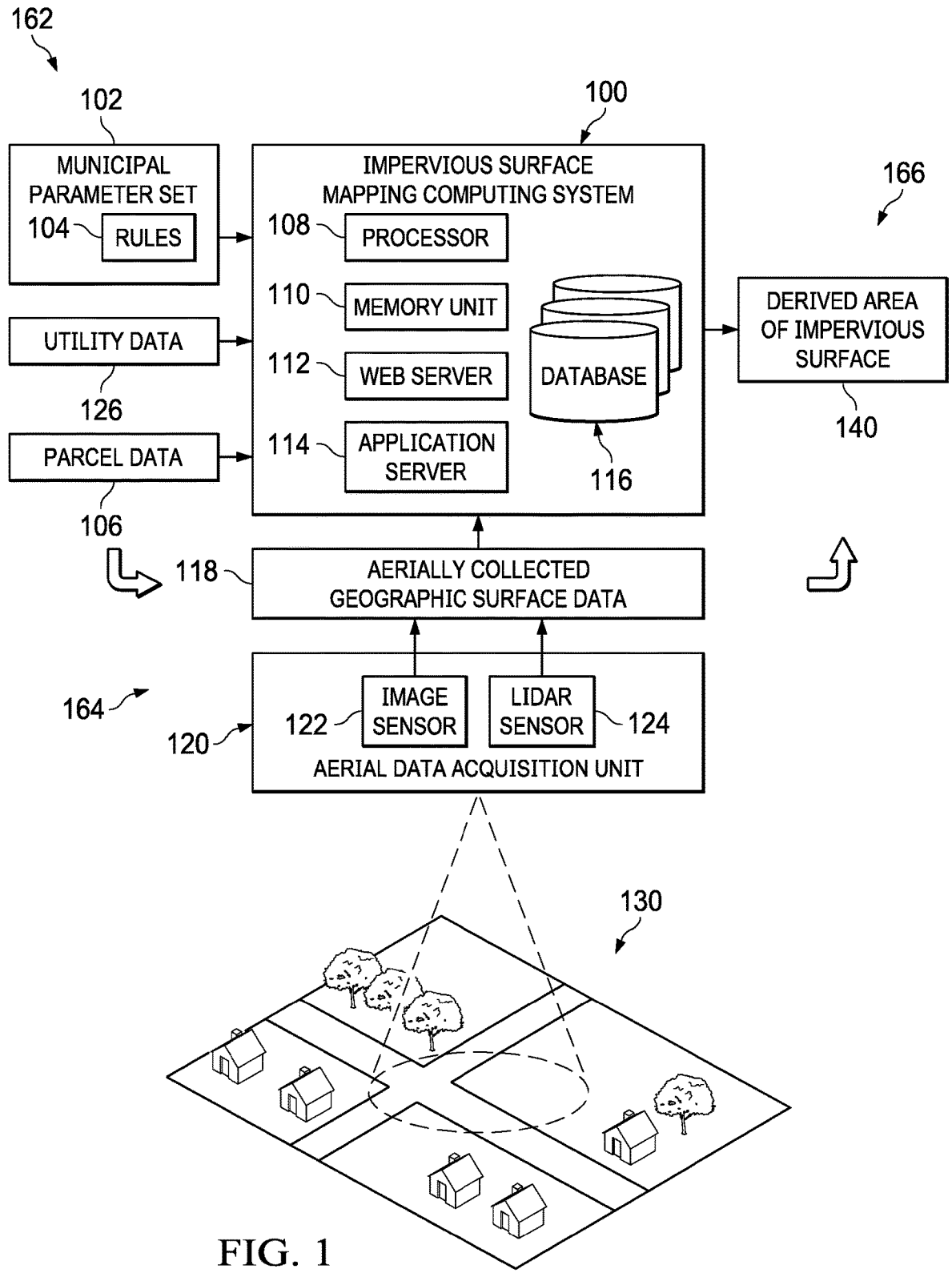
FIG. 1 depicts a system flow diagram of an example impervious surface mapping computing system.

Various non-limiting embodiments of the present disclosure will now be described to provide an overall understanding of the principles of the structure, function, and use of the impervious surface mapping systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As described in more detail below, the systems and methods described herein can utilize aerially collected geographic surface data to identify and quantify impervious surfaces within a target geographic area. In accordance with various embodiments, the aerially collected geographic surface data can comprises four-band imagery and light detection and ranging (LIDAR) data. Using this data, object-based image analysis (OBIA) can allow for precise feature extraction. For example, four-band imagery provides a color infrared (CIR) band that can make vegetation present as red and paved surfaces present as grey or otherwise a dark color. LIDAR data collected from the target geographic area, which uses pulsed light, can provide for elevation modeling. Additionally, as paved surfaces absorb the light pulses and trees and grass reflect the pulses, the strength of the returned pulses can also play a role in the identification of objects within a target geographic area.

As described in more detail below, certain surfaces, such as public roadways and municipal sidewalks, can be excluded from the results in an automated fashion. Impervious surfaces can ultimately be linked to a particular parcel within the target geographic area for billing purposes. In some embodiments, impervious surfaces that are not physically located within the boundaries of a particular parcel can still be associated with that parcel for billing purposes.

FIG. 1 depicts a system flow diagram of an example impervious surface mapping computing system 100 in accordance with one non-limiting embodiment. The impervious surface mapping computing system 100 can be used, for instance, to identify and quantify impervious surfaces within a particular geographic area. The system flow diagram includes three example processing phases, a mapping preparation phase 162, a data collection phase 164, and a data processing phase 166, each of which is described in more detail below.

The impervious surface mapping computing system 100 can be provided using any suitable processor-based device or system, such as a personal computer, laptop, server, mainframe, or a collection (e.g., network) of multiple computers, for example. The impervious surface mapping computing system 100 can include one or more processors (e.g., 108) and one or more computer memory units (e.g., 110). For convenience, only one processor 108 and only one memory unit 110 are shown in FIG. 1. The processor 108 can execute software instructions stored on the memory unit 110. The processor 108 can be implemented as an integrated circuit (IC) having one or multiple cores. The memory unit 110 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 110 can store executable software and data, such that when the processor 108 of the impervious surface mapping computing system 100 executes the software, the processor 108 can be caused to perform the various operations of the impervious surface mapping computing system 100, such as receive information from computer devices or other sources, receive aerially collected geographic surface data, and process the aerially collected geographic surface data to determine a derived area of impervious surface, as discussed in more detail below. Data used by the impervious surface mapping computing system 100 can be from various sources, such as from databases 116, third party sources, and/or other types of electronic data stores. The data stored in the databases 116 can be stored in a non-volatile computer memory, such as a hard disk drive, a read only memory (e.g., a ROM IC), or other types of non-volatile memory. Also, the data associated with the databases 116 can be stored on a remote electronic computer system, for example.

As shown in FIG. 1, in some embodiments, the impervious surface mapping computing system 100 can include several computer servers. For example, the impervious surface mapping computing system 100 can include one or more web servers (e.g., 112) and application servers (e.g., 114). For convenience, only one web server 112 and one application server 114 are shown in FIG. 1, although it should be recognized that this disclosure is not so limited. In accordance with various embodiments, the web server 112 can provide a graphical web user interface through which users of the system can interact with the impervious surface mapping computing system 100. The web server 112 can accept requests, such as HTTP requests, from clients, and serve the clients responses, such as HTTP responses, along with optional data content, such as web pages (e.g., HTML documents) and linked objects (such as images, etc.).

In some embodiments, the application server 114 can provide a user interface for users who do not communicate with the impervious surface mapping computing system 100 using a web browser. Such users can have, for example, special software installed on a computing device that allows them to communicate with the application server 114 via a communications network. Such software can be downloaded, for example, from the impervious surface mapping computing system 100, or other software application providers.

Although FIG. 1 depicts a limited number of elements for purposes of illustration, it can be appreciated that the impervious surface mapping computing system 100 can include more or fewer elements as well as other types of elements in accordance with the described embodiments. Elements of the impervious surface mapping computing system 100 can include physical or logical entities for communicating information implemented as hardware components (e.g., computing devices, processors, logic devices), executable computer program instructions (e.g., firmware, software) to be executed by various hardware components, or a combination thereof, as desired for a given set of design parameters or performance constraints.

Interactions with the impervious surface mapping computing system 100 for a particular target geographic can generally occur in phases. Referring first to the mapping preparation phase 162, the impervious surface mapping computing system 100 can receive or otherwise be provided with information to prepare for the impervious surface mapping process of a particular target geographic area 130. By way of example, a municipal parameter set 102 can be provided to the impervious surface mapping computing system 100 that can comprise a plurality of rules 104 for determining impervious surfaces. Example rules 104 can, for instance, define certain surface types (i.e., gravel, packed dirt, etc.) that qualify as impervious surfaces within that jurisdiction. Additionally or alternatively, the rules 104 can define which impervious surfaces are to be included in the derived area of impervious surface areas, even if such impervious surfaces are located outside a parcel, such as driveway aprons. Other example rules 104 can define the jurisdiction's treatment of pools and decks, among other types of rules.

Additional information, such as parcel data 106, can be provided to the impervious surface mapping computing system 100 during the mapping preparation phase 162. The parcel data 106 can include, for instance, GIS parcel boundary data for each parcel within the target geographic area 130. Additionally, the parcel data 106 can indicate the owner of the parcel by way of a tax identifier, as may be used for property tax assessment, for example. In accordance with some implementations, utility data 126 can also be provided to the impervious surface mapping computing system 100. The utility data 126 can include, for example, billing data for a stormwater utility for addresses within the municipality. This utility data 126 can be used to associate geocoded addresses within the target geographic area 130 with unique utility customer identifiers. As described in more detail below (see e.g., FIG. 8), using the parcel data 106 and the utility data 126, the impervious surface mapping computing system 100 can correlate the taxable ID of a parcel (which can be maintained by a county) and correlate it to a customer number of a stormwater utility (which can be maintained by a municipality) based on the addresses provide by the municipality utilizing a geocoding process.

During the data collection phase 164, aerially collected geographic surface data 118 is collected. The data collection phase 164 can occur prior to the mapping preparation phase 162 or subsequent to the mapping preparation phase 162. The aerially collected geographic surface data 118 can be gathered by an aerial data acquisition unit 120 that is mounted in an aircraft that flies over the target geographic area 130. In other embodiments, the aerial data acquisition unit 120 is deployed on a satellite. The aerial data acquisition unit 120 provides for geospatial mapping and can include a variety of onboard sensors, such as an image sensor 122 and a LIDAR sensor 124.

In accordance with one embodiment, the image sensor 122 provides four bands of the electromagnetic spectrum, including red (610-660 nm), green (530-580 nm), blue (435-495 nm) and near-infrared (840-1,000 nm). The LIDAR sensor 124 can be mounted on the underside of the aircraft and can transmit pulses of a narrow laser beam towards the target geographic area 130. A receiver affixed to the aircraft receives reflections of the pulses as they bounce off the ground surface and objects on the ground and then back to the aircraft. Many LIDAR systems use a scanning mirror to generate a swath of light pulses. Swath width depends on the mirror's angle of oscillation, and the ground-point density depends on factors such as aircraft speed and mirror oscillation rate. Each LIDAR laser reflection provides a single point on the ground. Elevations can be determined by computing the amount of time it takes light to leave an airplane, travel to the ground and return to the sensor. The intensity of the energy collected by the LIDAR sensor 124 can further assist the impervious surface mapping computing system 100 with classification of the ground phenomenon.

In accordance with the present disclosure, the four-band imagery data and LIDAR data can be co-collected while the aircraft equipment with the aerial data acquisition unit 120 flies over a target geographic area 130 and uploaded to the impervious surface mapping computing system 100. The target geographic area 130 can include, for example, the municipality to which the municipal parameter set 102, the parcel data 106, and the utility data 126 are related. In accordance with some embodiments, the aerially collected geographic surface data 118 is an 8-dimension data cube (red, blue, green, infrared, x-coordinate, y-coordinate, z-coordinate, and intensity) for every location within the target geographic area 130 scanned by the aerial data acquisition unit 120.

In accordance with the present disclosure, the aerially collected geographic surface data 118 can be interpreted by the impervious surface mapping computing system 100 during the data processing phase 166 to recognize and classify objects, structures, and flora (collectively referred to as ground phenomenon) of the target geographic area 130, including impervious services. As discussed in more detail below, based on this analysis of the aerially collected geographic surface data 118, the impervious surface mapping computing system 100 can ultimately determine a derived area of impervious surface 140 and associate the surfaces to particular parcels. Example processes for determining the derived area of impervious surface 140 that can be executed by the impervious surface mapping computing system 100 are presented in FIGS. 2-3.

Figure 2:
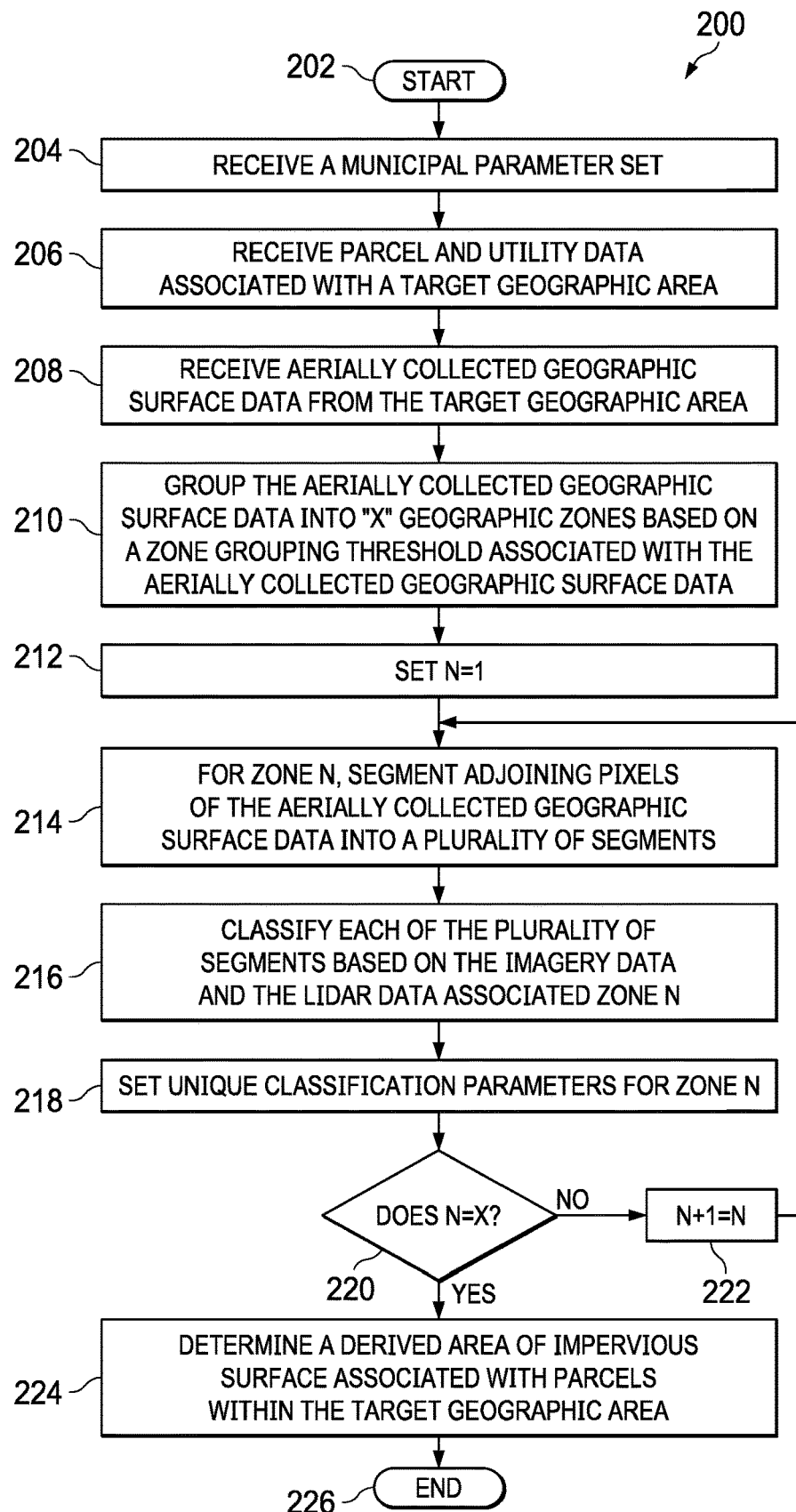
FIG. 2 depicts an example impervious surface mapping process utilizing aerially collected four-band imagery and light detection and ranging (LIDAR) data.

FIG. 2 shows an example impervious surface mapping process 200 utilizing aerially collected four-band imagery and LIDAR data that can be executed by the impervious surface mapping computing system 100. Referring to FIGS. 1-2, after the process 200 starts at 202, a municipal parameter set 102 is received at 204. The municipal parameter set 102 can include, for example, a plurality of rules 104 associated with impervious surface determination. As is to be appreciated, the rules 104 can vary based on the municipality being mapped. At 206, parcel data 106 and utility data 126 associated with a target geographic area 130 is received. At 208, aerially collected geographic surface data 118 from the target geographic area 130 is received by the impervious surface mapping computing system 100. As described above, the aerially collected geographic surface data 118 can include four-band imagery data and LIDAR data can be co-collected by an aerial data acquisition unit 120 that is flown over the target geographic area 130.

In order to aid in the image analysis, at 210, the impervious surface mapping computing system 100 can first group the aerially collected geographic surface data 118 into a plurality of geographic zones (i.e., X number of zones). In some embodiments, the impervious surface mapping computing system 100 utilizes ten geographic zones, although this disclosure is not so limited. The geographic zones can be zones that generally share common characteristics, such as urban, rural, forest, etc., as each zone can be separately processed to classify the ground phenomenon located therein.

The impervious surface mapping computing system 100 can utilize a zone grouping threshold in order to define X number of zones. While the type of zone grouping threshold can vary, in some embodiments, the zone grouping threshold can utilize infrared data obtained from the image sensor 122. The infrared data can be used to identify a relative percentage of vegetation, as vegetation provides a readily identifiable infrared signature. The target geographic area 130 can, for instance, can be automatically grouped into zones by the impervious surface mapping computing system 100 based on a particular percentage of vegetation such that each location within the target geographic area 130 is assigned to a single zone. A first zone may contain geographic areas having between 90%-100% vegetation, a second zone may geographic areas having between 85%-90% of vegetation and so forth. In other embodiments, however, the zone grouping threshold can be based on different data, such as one or more data dimensions collected by the aerial data acquisition unit 120. By dividing the target geographic area 130 into smaller geographic zones (i.e., see FIG. 4), the image processing parameters for each zone can be fine-tuned to identify impervious surfaces within each individual zone with greater specificity and accuracy.

At 212-222, the process 200 can step through each of the geographic zones (i.e., X number of zones) to analytically classify each surface located within the zone. At 212, a variable N is set to 1. At 214, for the first zone, object-based image analysis (OBIA) techniques can be used by the impervious surface mapping computing system 100, which utilizes processes that segment and classify pixels within the image into groups (e.g., homogeneous objects). At 216, each of the plurality of segments can be classified based on the imagery data and LIDAR data collected from the segment. The classification parameters for the first zone can be uniquely defined at 218, as the classification parameters for each of the plurality of zones used by the impervious surface mapping computing system 100 can vary.

At 220, the impervious surface mapping computing system 100 determines if it has processed through each of the geographic zones. If it has not, it loops back to 214 after incrementing the variable N at 222. Otherwise the process proceeds to 224 to determine a derived area of impervious surface associated with parcels within the target geographic area 130. The derived area of impervious surface can be based on the classification of all ground phenomena and a quantification of the ground phenomena that is an impervious surface. The process ends at 226.

Figure 3:
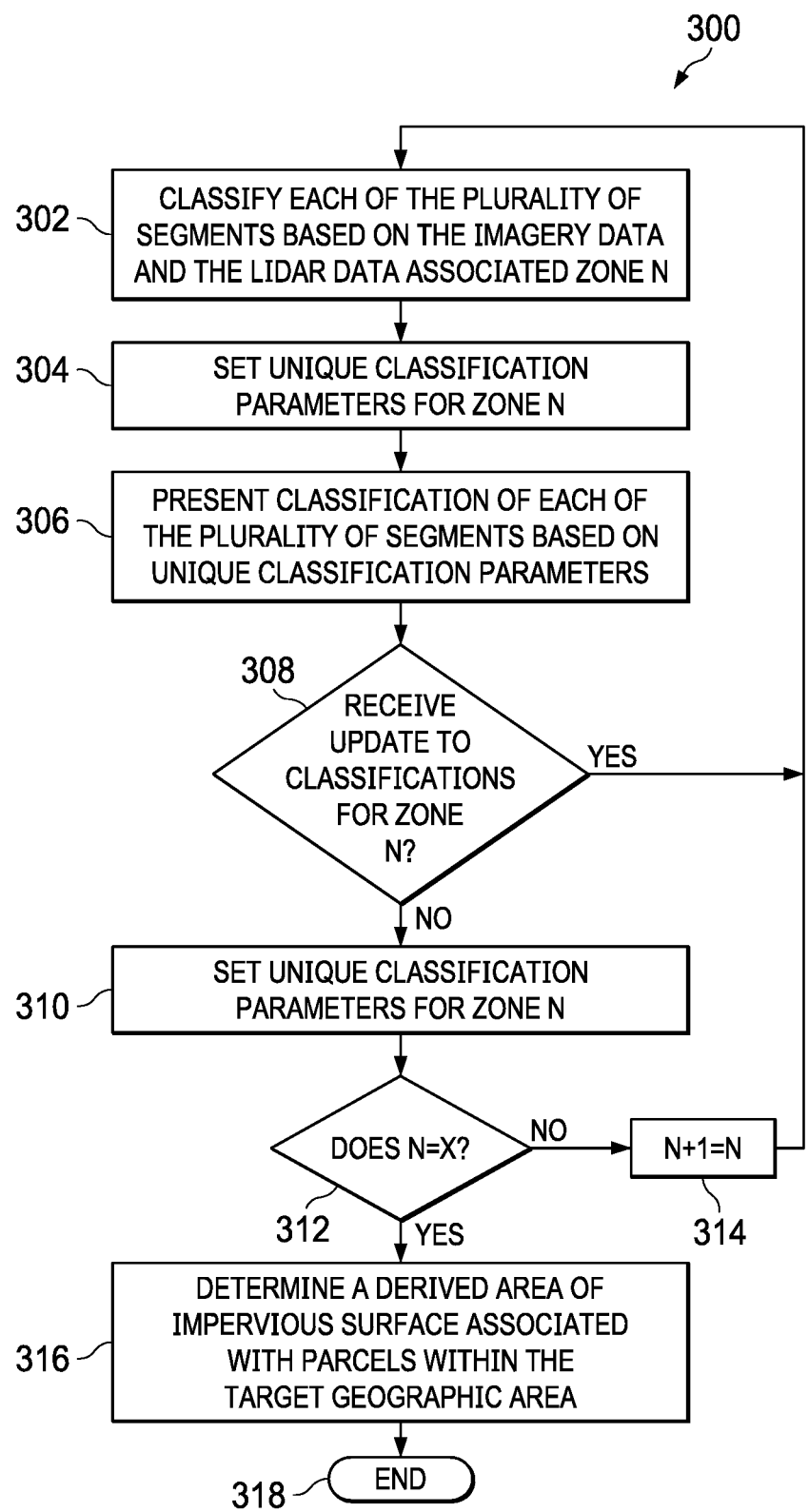
FIG. 3 depicts another example impervious surface mapping process.

Referring now to FIG. 3, a process 300 is depicted in which the classification parameters for one or more zone can be updated, such as through user intervention, as to increase the accuracy of classification and proper application of processing rules. At 302, each of the plurality of segments within a particular zone can be initially classified based on the imagery data and LIDAR data collected from the segment, similar to step 216 in FIG. 2. The classification parameters for the first zone can be uniquely defined at 304 based on this attempt. At 306, the classifications can be presented to a user for quality control. The user of the impervious surface mapping computing system 100 can investigate the classifications to assess the accuracy. For instance, the user can re-classify certain ground phenomenon of a particular zone by submitting to the impervious surface mapping computing system 100 an update to the classifications at 308. If an update is received, the process can loop back to 302 and re-classify each of the segments based on the update to the classification parameters. This iterative process can repeat until no further updates are received. If no updates are received, the process can continue to 310 where the unique classification parameters are set for the zone. The process can continue through each of the zones, as indicated by 312 and 314, until each of the zones has received one or more updates to the classifications, as may be needed. At 316, based on the classifications, the derived area of impervious surface associated with parcels within the target geographic area 130 can be determined. The process ends at 318.

Figure 4:
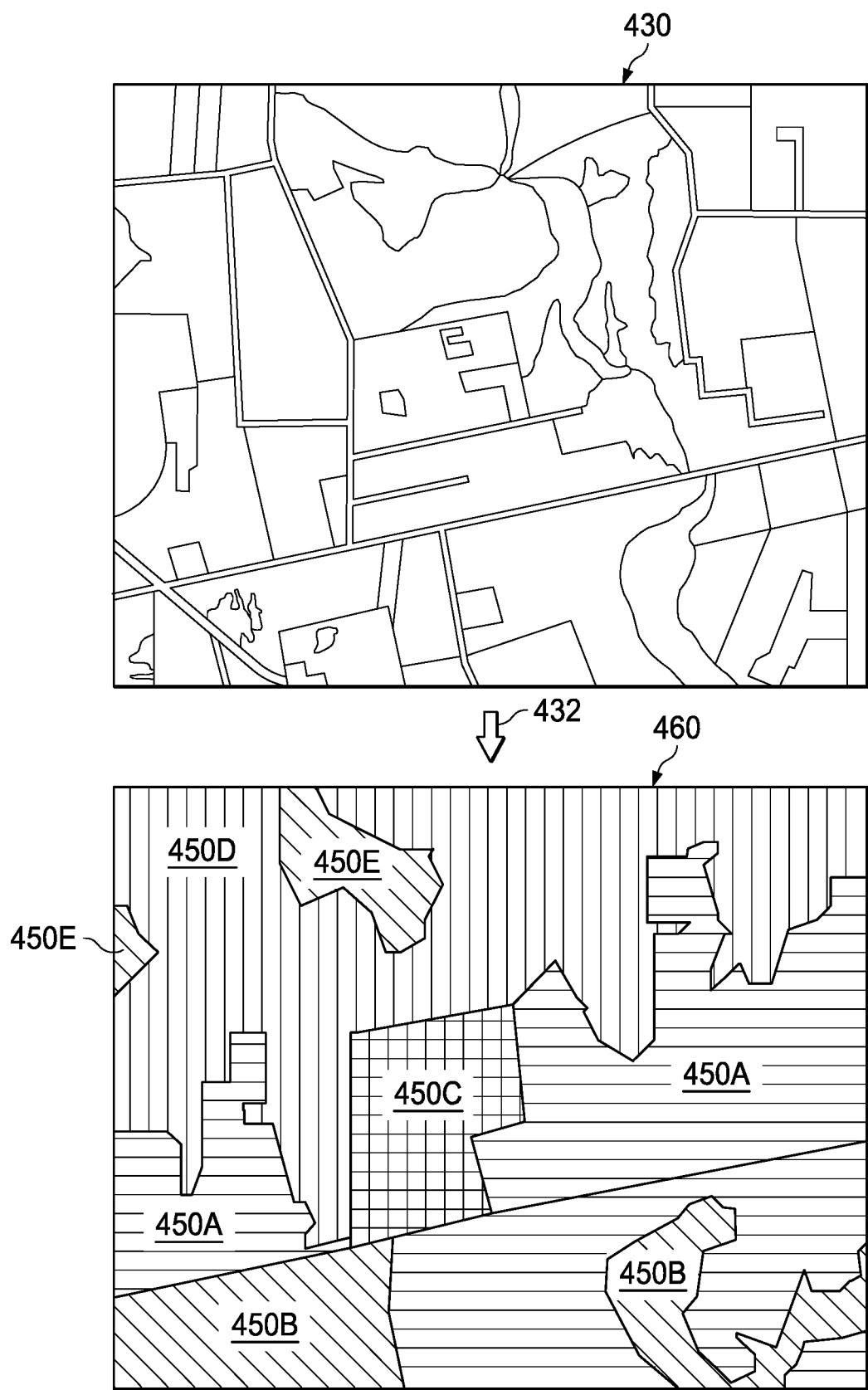
FIG. 4 schematically depicts an example target geographic zone being grouped into geographic zones for determination of unique classification parameters for each geographic zone.

FIG. 4 schematically depicts an example target geographic area 430 being grouped into geographic zones 450A-E for determination of unique classification parameters. The target geographic area 430 includes areas of relatively dense population along with rural areas. The target geographic area 430 also contains areas having high percentages of vegetation and areas of lesser percentages of vegetation. Based on the image processing described herein and indicated by arrow 432, the target geographic area 430 can be divided into the geographic zones 450A-E, which each share similar qualities (i.e., similar data signatures based on the aerially collected geographic surface data). For the processed geographic area 460 of FIG. 4, a vegetation threshold is used to determine the geographic zones 450A-E, although this disclosure is not so limited. Further, while five different zones geographic 450A-E are depicted in FIG. 4, in other embodiments, the image processing can identify more or fewer different zones. As provided above, unique classification parameters of each of the geographic zones 450A-E can be determined by the impervious surface mapping computing system 100 in order to increase the accuracy of the classification processing.

Figure 5:
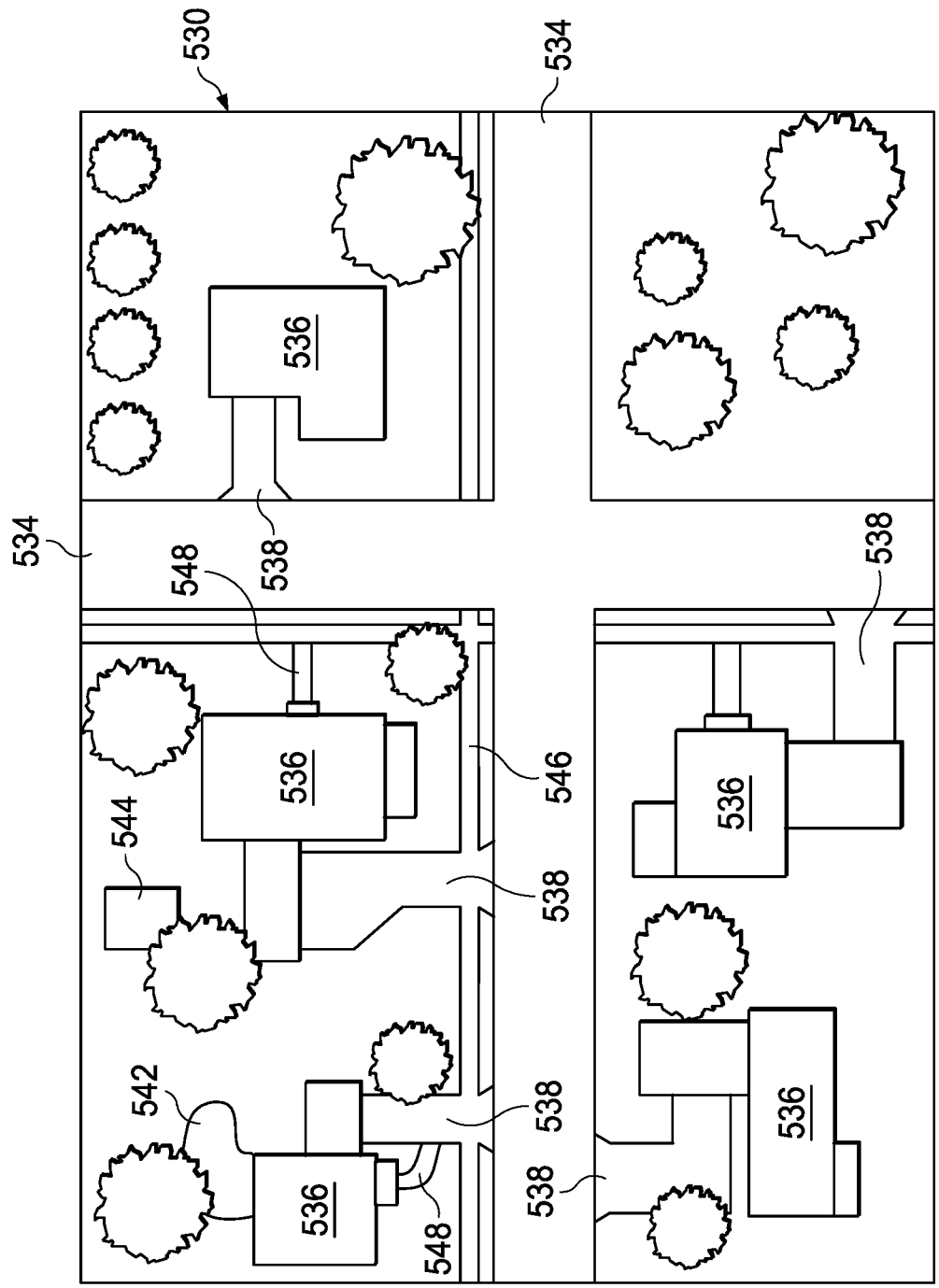
FIG. 5 schematically depicts an example target geographic zone having impervious surfaces.
Figure 6:
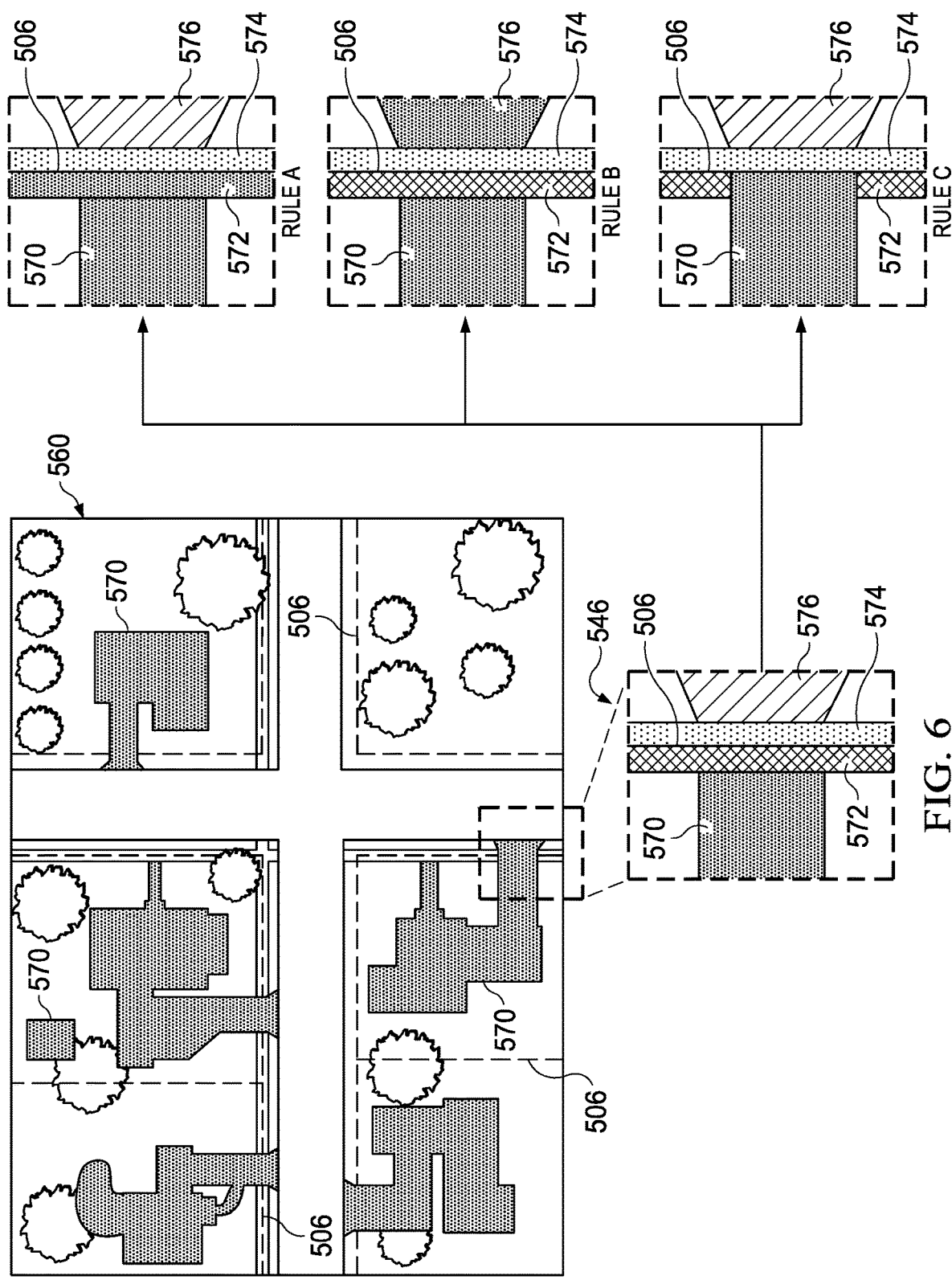
FIG. 6 schematically depicts the identification of impervious surfaces of the example target geographic zone of FIG. 5 and example processing rules for determining the same.
Figure 7:
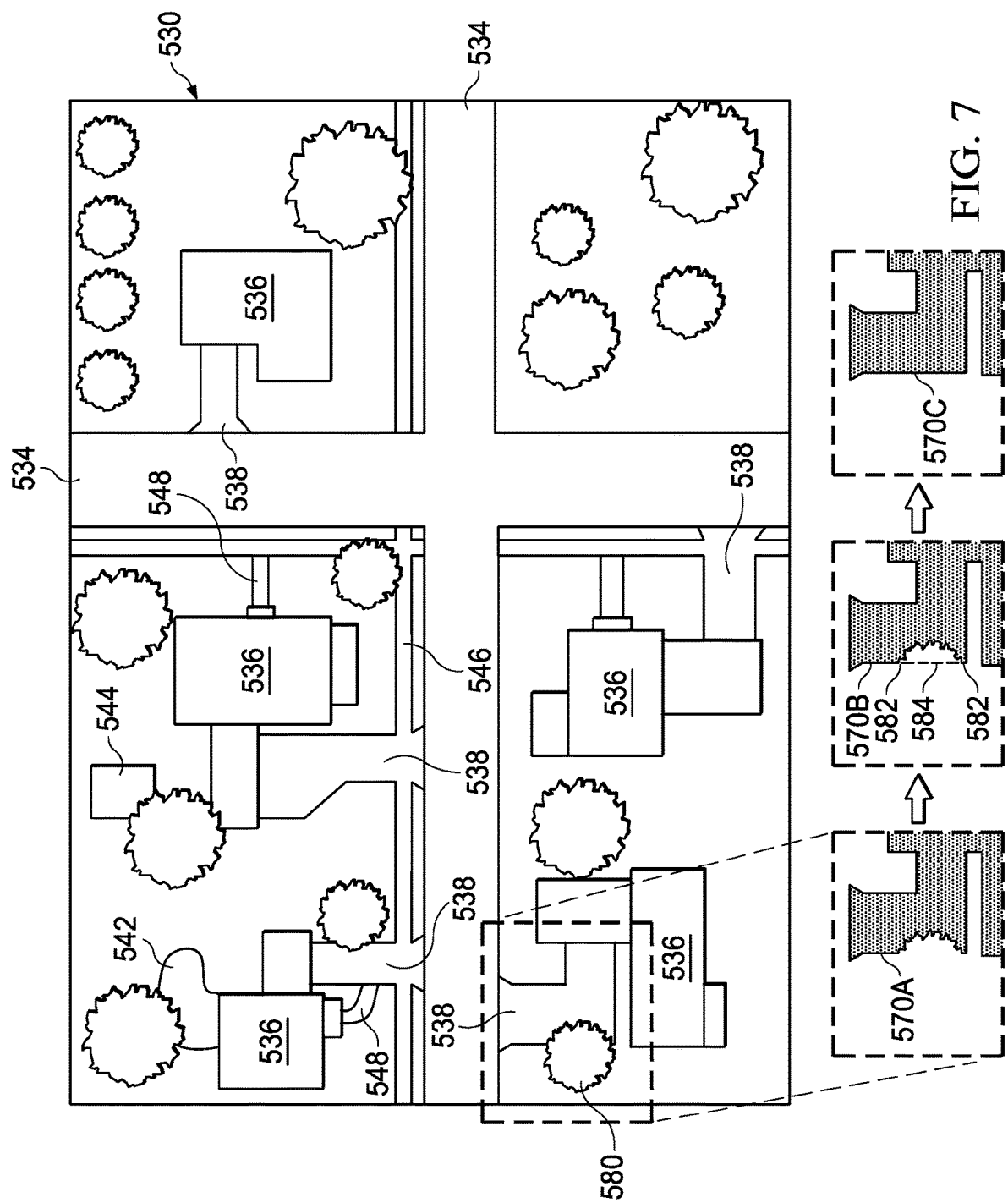
FIG. 7 schematically depicts an example rule for determining the impervious surfaces of the example target geographic zone of FIG. 5.

FIGS. 5-7 schematically depict the derivation of impervious surface area of a portion of an example target geographic zone. Referring first to FIG. 5, the target geographic area 530 includes a residential area having typical features, such as streets 534 and municipal sidewalks 546. For illustration purposes, the target geographic area 530 also includes other ground phenomenon, such as dwellings 536, driveways 538, and residential sidewalks 548. Also shown are patios 542 and sheds 544. As is to be appreciated, the target geographic area 530 is to represent a portion of the target geographic area 430 (FIG. 4) or the target geographic area 130 (FIG. 1).

In accordance with the present disclosure, an aerial data acquisition unit can be flown over the target geographic area 530 to collect geographic surface data. An impervious surface mapping computing system similar to the impervious surface mapping computing system 100 can be used to process the aerially collected geographic surface data in accordance with the present disclosure. FIG. 6 schematically depicts the processed geographic area 560. As shown, parcel lines 506, as received by the impervious surface mapping computing system, have been overlaid to delineate the property boundaries of parcels within the processed geographic area 560. Areas of solid black in FIG. 6 represent impervious surfaces, as derived by an impervious surface mapping computing system and based on the municipality's rules for determining the same. As shown in FIG. 5, areas of impervious surface identified by the impervious surface mapping computing system include the dwellings 536, patios 542, residential sidewalks 548, and sheds 544. These surfaces were identified in accordance with the image analysis techniques described above. More specifically, each of these objects was classified based on their red data, blue data, green data, infrared data, x-coordinate, y-coordinate, z-coordinate, and intensity data. Notably, the streets 534 are excluded from the derived area of impervious surface in FIG. 6, as in this embodiment those impervious surfaces are not to be included in the impervious surface determination.

Rules associated with quantifying the impervious surfaces of the target geographic area 530 can determine how certain surfaces are to be handled by the impervious surface mapping computing system. For the purposes of illustration, the parcel lines 506 of FIG. 6 are shown to separate the municipal sidewalks 546 into two areas. A first area 572 is shown to be within an associated parcel and a second area 574 is shown to be outside the associated parcel. As shown, a driveway apron 576 associated with a parcel is also shown to be outside parcel boundary defined by the parcel line 506. Municipalities can decide how such occurrence should be handled by way of rules provided to the impervious surface mapping computing system (i.e., rules 104 in FIG. 1). Example Rules A-C are schematically illustrated which show example approaches to handling the impervious surface associated with the municipal sidewalk 546 and the driveway apron 576.

Referring first to Rule A, as shown in FIG. 6, the first area 572 of the municipal sidewalks 546 is identified as an impervious surface attributable to the associated parcel. The driveway apron 576, however, is not. Referring next to Rule B, neither the driveway apron 576 nor the first area 572 are identified as impervious surfaces attributable to the associated parcel. Finally, as schematically shown, Rule C includes the portion of the driveway 570 that extends to the parcel line 506. It is to be appreciated, that Rules A-C are depicted for illustration purposes only, as a variety of different processing rules can be implemented by impervious surface mapping computing systems in accordance with the present disclosure. For instance, a rule can establish that the portion of the driveway extending outward from the properly line until it meets a roadway is to be an impervious surface attributable to the associated parcel.

As shown in FIG. 7, when the aerially collected geographic surface data is obtained, certain surfaces may be blocked or obscured. For instance, shadows may prohibit adequate data from certain ground phenomenon being provided to an aerial data acquisition unit. Additionally, other areas may be obscured by vegetation, trees, or other objects, generally shown as obstructions 580 in FIG. 7, which can be exacerbated by an increased angle between the ground phenomenon and the aerial data acquisition unit during data collection. In accordance with the system and methods described herein, obscured areas can be contextually quantified based on information obtained from surrounding areas and the classifications thereof. By way of a non-limiting example, FIG. 7 illustrates an example obstruction 580 that is a tree overhanging a driveway 570. The tree may inhibit the ability to obtain surface data on the portion of the driveway 570 that is located below the tree's foliage. More particularly, neither an image sensor nor a LIDAR sensor of an aerial data acquisition unit may be able to obtain a suitable amount of data points for that particular area during a data collection phase.

As shown by driveway 570A, the portion of the driveway obscured by the tree is initially not identified as an impervious surface, as little or no data was collected from that portion. However, with an impervious surface mapping computing system identifying the surrounding area as a driveway, the system can be aware that driveways are typically of generally rectangular shape. As shown, the impervious surface mapping computing system can extend a phantom boundary 584 between points 582 to form driveway 570B into a rectangle. Once formed, the area of the driveway originally obscured in the aerially collected data can be identified as part of the driveway 570C and counted toward the amount of impervious surface for a parcel.

While FIG. 7 schematically depicts an example of a tree obscuring, it is to be appreciated that for any target geographic area, a number of objects may be obscured by shadow, voids, and the like. The image processing of the impervious surface mapping computing system described herein can contextually determine a surface type of those obscured areas.

Figure 8:
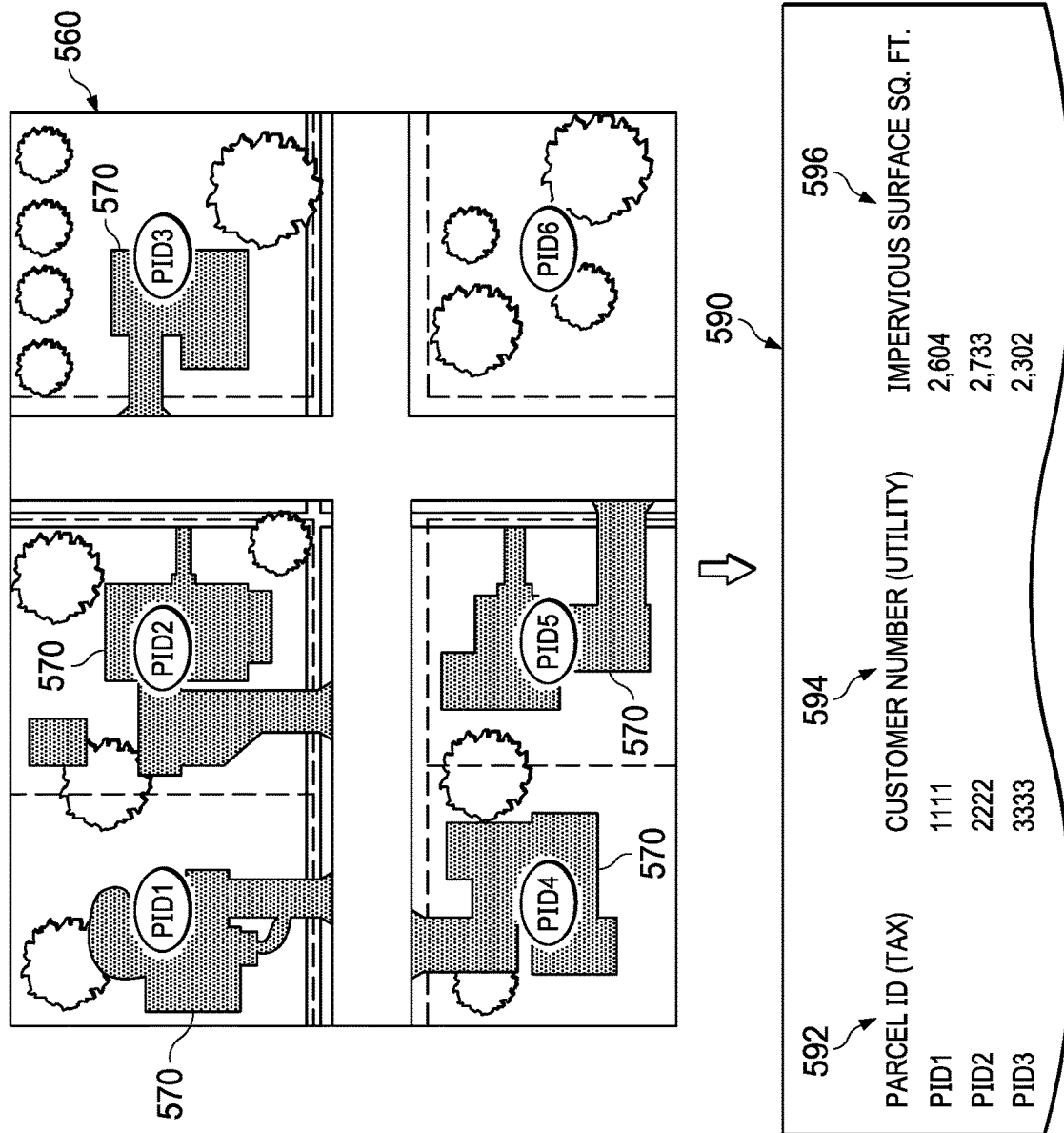
FIG. 8 schematically depicts the correlation of determined impervious surfaces to parcels.

Referring now to FIG. 8, an example correlation of parcel-specific impervious surface area to a utility customer number is depicted. As shown, each parcel in the processed geographic area 560 is associated with a parcel identification number (shown as PID1-PID6). Such parcel identification number can be associated, for instance, with the property tax paid for the parcel. This parcel data can be provided to the impervious surface mapping computing system as parcel data 106, similar the parcel data 106 illustrated in FIG. 1. Reporting 590 includes a listing 592 of parcel identification numbers. Also utilized by the reporting 590 is a utility customer number 594, which can be associated with an address. Using a geocoding process, an impervious surface mapping computing system can correlate the address associated with the utility customer number 594 with the parcel identification number 592. Then using the processing rules for the municipality, the square footage 596 of impervious surface attributable to each parcel can be provided. The square footage can be used to determine a billing amount, which can be based on equivalent residential units (ERUs), for instance. In some municipalities, for example, one ERU is equal to 2,536 square feet. Based on the square footage 596 in the reporting 590, the monthly utility fee based on ERUs can be calculated.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, such as, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A computer-based method of identifying impervious surfaces based on aerially collected geographic surface data, the method performed by an impervious surface mapping computing system comprising instructions stored in a memory, which when executed by one or more processors of the impervious surface mapping computing system, cause the impervious surface mapping computing system to perform the method comprising:
   receiving, by the impervious surface mapping computing system, aerially collected geographic surface data from a target geographic area, wherein the target geographic area comprises parcels, and wherein the aerially collected geographic surface data comprises a plurality of pixels;
   based on a zone grouping threshold associated with the aerially collected geographic surface data, grouping the aerially collected geographic surface data into a plurality of geographic zones;
   for each of the plurality of geographic zones:
      segmenting, by the impervious surface mapping computing system, adjoining pixels of the aerially collected geographic surface data into a plurality of segments; and
      classifying, by the impervious surface mapping computing system, each of the plurality of segments; and
   based on parcel data associated with the target geographic area and one or more rules for identifying impervious surfaces for a target geographic area, determining, by the impervious surface mapping computing system, a derived area of impervious surface associated with parcels within the target geographic area, wherein determining the derived area of impervious surface associated with parcels within the target geographic area is based on a surface type identified within the parcel, wherein based on the one or more rules for identifying impervious surfaces, a gravel is not to be included in the derived area of impervious surface and pavement is to be included in the derived area of impervious surface.

2. The computer-based method of claim 1, wherein for each of the plurality of geographic zones, the impervious surface mapping computing system determines a unique set of classification parameters.

3. The computer-based method of claim 1, wherein the grouping of the aerially collected geographic surface data into the plurality of geographic zones is based on vegetation index.

4. The computer-based method of claim 3, wherein the plurality of geographic zones comprises a first zone having at least a first percentage amount of vegetation and a second zone having less than the first percentage amount of vegetation.

5. The computer-based method of claim 3, wherein the plurality of geographic zones comprises at least five geographic zones.

6. The computer-based method of claim 1, wherein the aerially collected geographic surface data comprises four-band imagery across the target geographic area.

7. The computer-based method of claim 6, wherein the aerially collected geographic surface data comprises elevational data across the target geographic area.

8. The computer-based method of claim 1, wherein the derived area of impervious surface associated with at least one of the parcels within the target geographic area includes an area of impervious surface that extends beyond a property line of the at least one of the parcels.

9. The computer-based method of claim 8, wherein the area of impervious surface that extends beyond the property line of the at least one of the parcels is bounded by a road edge.

10. The computer-based method of claim 1, further comprising:
   determining that at least some of the derived area of impervious surface is a municipal sidewalk; and
   based on the one or more rules for identifying impervious surfacest, subtracting the municipal sidewalk from the derived area of impervious surface.

11. The computer-based method of claim 1, further comprising:
   identifying, by the impervious surface mapping computing system, a swimming pool based on the aerially collected geographic surface data;
   determining, by the impervious surface mapping computing system, an area of the swimming pool; and
   based on the one or more rules for identifying impervious surfaces, either including the area of the swimming pool in the derived area of impervious surface or subtracting the area of the swimming pool from the derived area of impervious surface.

12. The computer-based method of claim 1, wherein the derived area of impervious surface comprises a plurality of types of impervious surfaces.

13. A computer-based method of identifying impervious surfaces based on aerially collected geographic surface data, the method performed by an impervious surface mapping computing system comprising instructions stored in a memory, which when executed by one or more processors of the impervious surface mapping computing system, cause the impervious surface mapping computing system to perform the method comprising:
 receiving, by the impervious surface mapping computing system, one or more rules for identifying impervious surfaces for a target geographic area;
 receiving, by the impervious surface mapping computing system, parcel data associated with the target geographic area;
 receiving, by the impervious surface mapping computing system, aerially collected geographic surface data from the target geographic area, wherein the aerially collected geographic surface data comprises a plurality of pixels, and wherein imagery data and Light Detection and Ranging (LIDAR) data is associated with each of the plurality of pixels;
 segmenting, by the impervious surface mapping computing system, adjoining pixels of the aerially collected geographic surface data into a plurality of segments;
 classifying, by the impervious surface mapping computing system, each of the plurality of segments based on the imagery data and the LIDAR data associated with each segment;
 based on the parcel data and the one or more rules for identifying impervious surfaces, determining, by the impervious surface mapping computing system, a derived area of impervious surface associated with parcels within the target geographic area, wherein determining the derived area of impervious surface associated with parcels within the target geographic area is based on a surface type identified within the parcel, wherein determining the derived area of impervious surface associated with parcels within the target geographic area is based on a surface type identified within the parcel, wherein a first surface type is not to be included in the derived area of impervious surface and a second surface type is to be included in the derived area of impervious surface.

14. The computer-based method of claim 13, wherein the derived area of impervious surface comprises an area obscured in the aerially collected geographic surface data, wherein the area obscured in the aerially collected geographic surface data is obscured by any of a tree and a shadow.

15. The computer-based method of claim 13, wherein the aerially collected geographic surface data comprises four-band imagery across the target geographic area.

16. A computer-based method of identifying impervious surfaces based on aerially collected geographic surface data, the method performed by an impervious surface mapping computing system comprising instructions stored in a memory, which when executed by one or more processors of the impervious surface mapping computing system, cause the impervious surface mapping computing system to perform the method comprising:
 receiving, by the impervious surface mapping computing system, a municipal parameter set, wherein the municipal parameter set identifies one or more rules for identifying impervious surfaces for a target geographic area;
 receiving, by the impervious surface mapping computing system, parcel data associated with the target geographic area;
 receiving, by the impervious surface mapping computing system, aerially collected geographic surface data from the target geographic area, wherein the aerially collected geographic surface data comprises a plurality of pixels, and wherein imagery data and Light Detection and Ranging (LIDAR) data is associated with each of the plurality of pixels;
 segmenting, by the impervious surface mapping computing system, adjoining pixels of the aerially collected geographic surface data into a plurality of segments; and
 classifying, by the impervious surface mapping computing system, each of the plurality of segments based on the imagery data and the LIDAR data associated with each segment;
 based on the parcel data and the municipal parameter set, determining, by the impervious surface mapping computing system, a derived area of impervious surface associated with parcels within the target geographic area, wherein determining the derived area of impervious surface associated with parcels within the target geographic area is based on a surface type identified within the parcel, wherein gravel is not to be included in the derived area of impervious surface and pavement is to be included in the derived area of impervious surface.

17. The computer-based method of claim 16, further comprising:
 based on a zone grouping threshold associated with the aerially collected geographic surface data, grouping the aerially collected geographic surface data into a plurality of geographic zones.

18. The computer-based method of claim 17, wherein for each of the plurality of geographic zones, the impervious surface mapping computing system determines a unique set of classification parameters.

19. The computer-based method of claim 16, wherein the aerially collected geographic surface data comprises:
 four-band imagery across the target geographic area; and
 elevational data across the target geographic area.

20. The computer-based method of claim 18, wherein the aerially collected geographic surface data comprises elevational data across the target geographic area.

* * * * *